Patented Oct. 11, 1927.

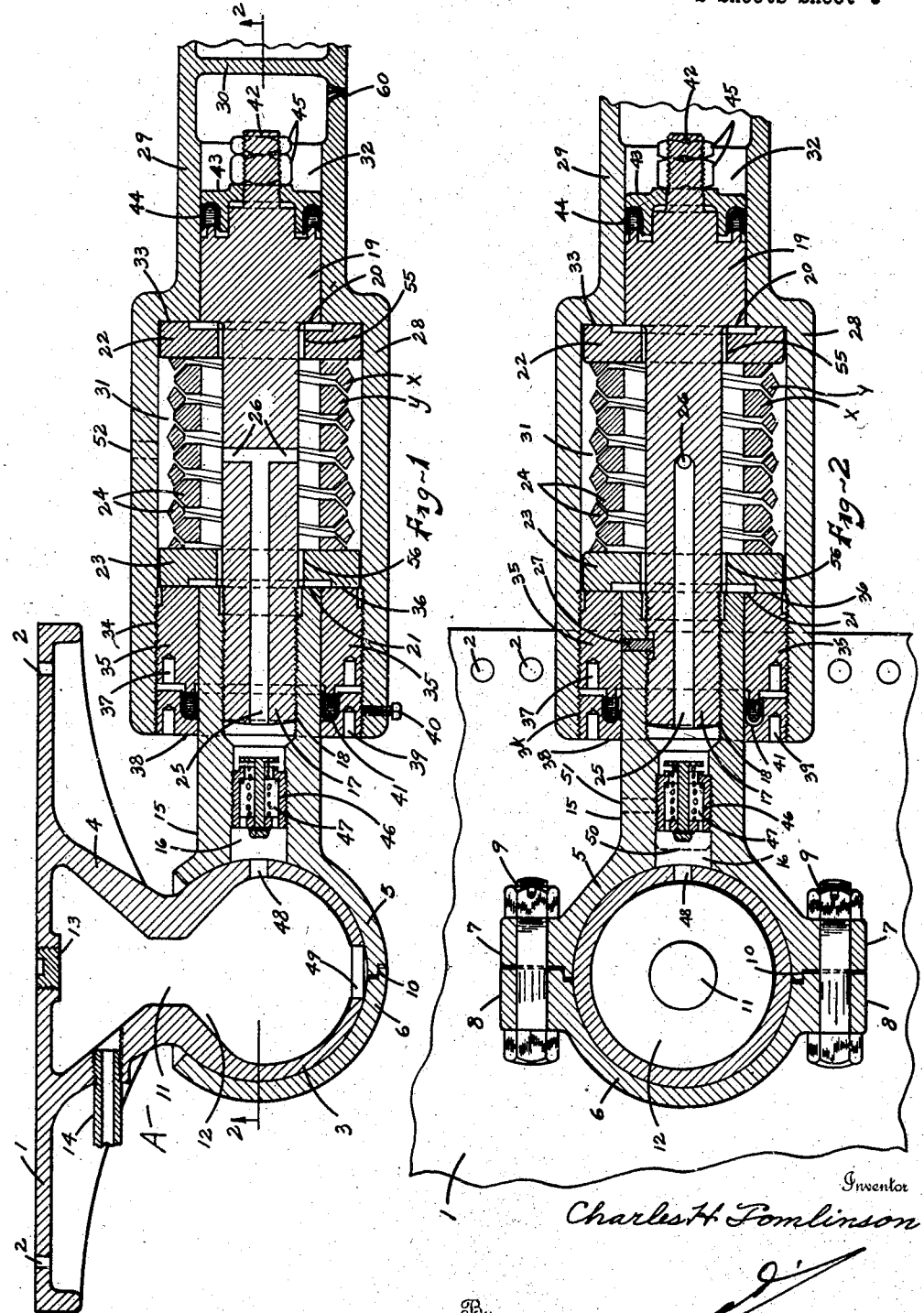

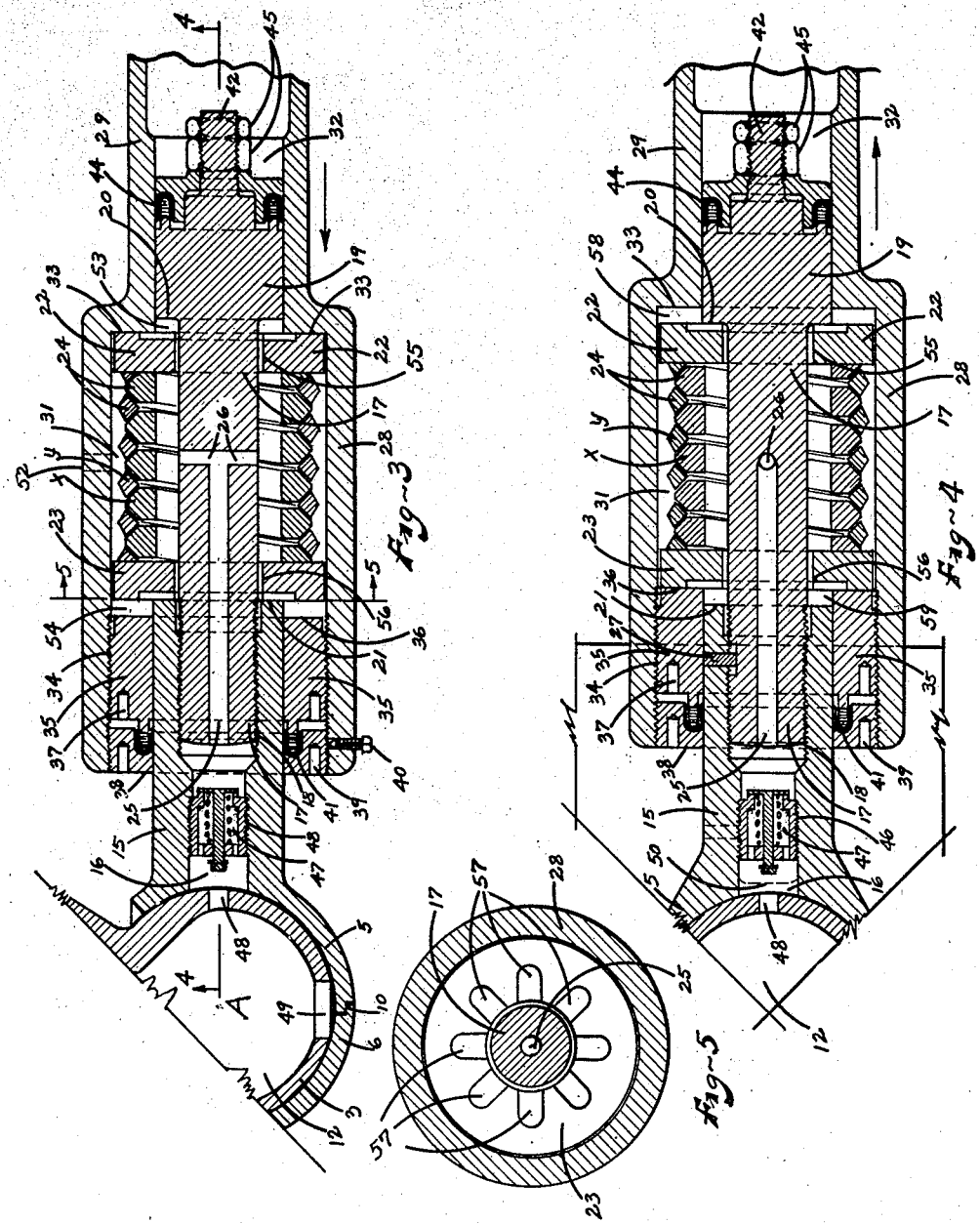

1,645,408

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

DRAFT GEAR.

Application filed June 2, 1925. Serial No. 34,390.

My invention relates to draft gears for car couplers and particularly that type of draft gear which employs a buffer spring for both tension and compression.

The object of my invention is to provide a draft gear having means to assist the spring in resisting the tension and compression forces which it is obliged to withstand, and to slow down the action of the draft gear and smooth out its operation. With the present type of spring draft gears when the gear is submitted to compression, as is the case when two cars are bumped together or moved together if in a coupled relation, the buffer spring in the gear is compressed and the tendency is when the compression is released for the spring to move the parts of the gear back to normal and this usually happens with great rapidity due to slackness of the parts after the compression is relieved, and this tends to produce considerable noise and some shock which is quite annoying when the gears are used in connection with passenger coaches.

I have found if the gear is constructed so as to permit the use of oil under such conditions as to form a check, that I am able to smooth out the operation of the gear and not only help it to resist the compression and tension forces, but also prevent the spring from returning the parts to normal quickly, but compels the parts to return to normal much slower than when a buffer spring alone is employed.

My invention resides in the new and novel construction, combination and relation of the various parts herein fully described and shown in the drawings accompanying and forming a part of this specification.

In the drawings:

Fig. 1 is a side view in section of my draft gear together with an anchorage casting for securing the gear with the parts in normal position to a car body.

Fig. 2 is a horizontal sectional view of my gear taken on the line 2—2 of Fig. 1.

Fig. 3 is a sectional view of my gear similar to that shown on Fig. 1, and shows the relation of the parts when the gear is placed under compression.

Fig. 4 is a view in section similar to Fig. 3 excepting showing the relation of the parts when the gear is placed under tension.

Fig. 5 is a sectional view on the line 5—5 of Fig. 3.

In the preferred embodiment of my invention I provide an anchorage A provided with a base plate 1 adapted to be attached to the under-framing of a car body by means of the bolt holes 2 properly disposed through the member 1. Secured to the base plate 1 is a suspended ball-shaped member 3 which is secured to the base plate 1 by means of the neck portion 4. The outer surface of the member 3 is made spherical and I prefer to machine it to a spherical shape so as to produce a smooth and true surface to receive the socket members 5 and 6, which are provided with cooperating lugs 7 and 8 respectively, and by means of which the clamping members 5 and 6, are held securely together upon the member 3 by the bolts and nuts 9.

The inner surface of the members 5 and 6, which engage the member 3, are also preferably machined so as to give as true a spherical surface as possible so that the members 5 and 6 when secured in position upon the member 3 will have free relative movement therewith. The adjacent faces of the members 5 and 6 are machined with an interlocking joint 10 in order to give a tight fit between these parts to prevent the loss of lubricating materials as later explained. In assembling the parts 5 and 6, I may employ a material such as white lead upon the joint 10 in order to assist in forming a tight joint.

The anchorage A is provided with an enclosed cavity 12 having two enlarged portions connected by a passage 11. For convenience in manufacture, the base member 1 has an opening leading to the cavity 12 which is closed by a threaded plug 13. Also leading to the cavity 12 is a pipe 14 which may have its opposite end leading to any convenient point of access and by means of which the fluid may be supplied to the interior of the anchorage A. Secured to the socket member 5 is a projecting stem 15 formed with a longitudinal recess 16 therethrough and which is enlarged at one end to receive the stem 17 which projects from the stem 15 and is secured thereto by a threaded engagement 18. The stem 17 has formed thereon an enlarged portion 19 which provides a shoulder 20 and the member 15 provides the shoulder 21.

Mounted upon the stem 17 are two collars 22 and 23 which may engage the shoulders 20 and 21 respectively, and which are moved toward the shoulders 20 and 21 by an interposed spring 24. The collars 22 and 23 are movable toward each other thereby pressing the spring 24 when the gears are operating under tension and compression. The tendency of the spring, however, is to resist movement of the collars toward each other and to maintain them in a spaced relation as far as the construction and adjustment of the gear will permit. The stem 17 is provided with a longitudinal passage 25 which opens into the passage 16 and which has branch openings 26 leading to the surface of the stem 17. The stems 15 and 17 are prevented from rotating by means of the pin 27 engaging a longitudinal slot.

Surrounding the stems 15 and 17, or portions thereof, is an enclosing member 28 which is mounted in telescopically movable relation with respect to the stems 15 and 17. The enclosing member 28 is provided with a projecting enclosing member 29 of reduced area and having a transverse partition 30 to close the end thereof. The diameter of the cavity in the portion 29 is such as to receive the member 19 on the stem 17 in slidable relation thereto and the interior diameter of the enclosing member 28 is such as to receive the collars 22 and 23 in slidable relation thereto. The reduction of the cavity 31 to that of 32 forms a shoulder 33 against which may be positioned the collar. The inner surface of the enclosing member 28 is provided with a thread 34 to receive the threaded bushing 35. This bushing is made with a sliding fit relative to the stem 15 and forms a shoulder 36 against which may be positioned the collar 23. The bushing 35 is provided with a plurality of shallow recesses 37 arranged to receive a spanner wrench which is used in applying and removing the bushing 35 and for adjusting the distance between the shoulders 33 and 36.

Also surrounding the stem 15 and secured in position by means of the threads 34 is a bushing 38 which is also provided with shallow recesses 39 adapted to receive a spanner wrench for application and adjustment of the same. The screw 40 is used to prevent the rotation of the bushing 38 when properly positioned. The bushing 38 is recessed to receive a U-shaped leather packing 41 to prevent the escape of liquid contained within the cavity 31. Projecting from the member 19 is a stem 42 and upon which is mounted a sleeve 43 which is recessed to receive a U-shaped leather packing 44 which also prevents the escape of liquid from the cavity 31 into the cavity 32. The collar 43 is held in position on the stem 42 by means of the nuts 45.

Mounted in the longitudinal channel 16 of the stem 15 is a check valve 46 normally held open by means of the spring 47, but which closes when liquid contained in the chamber 31 tends to move into the cavity 12.

The spring 47 is tensioned just enough to maintain the check valve open.

In assembling the parts, the collars 22 and 23 and the spring 24 may be positioned upon the stem 17 and then the stems 15 and 17 assembled to such an extent as to bring the distance between the shoulders 20 and 21 which will place the required tension upon the spring 24. The assembled stems 15 and 17, together with a packing 44, is then mounted within the member 28 and the bushing 35 is then screwed into position and so adjusted as to just meet the face of the collar 23 when the collar 22 engages the shoulder 33. The bushing 38 with the packing 41 is then placed in position and locked. The check valve 46 may then be positioned if it has not already been placed, and the parts are then ready to mount upon the anchorage A.

It is understood that the member 29 is adapted to receive a coupling head.

When the device has been installed upon a car liquid is placed within the various cavities by allowing the same to flow through the pipe 14 into the cavity 12 and from there to the cavity 16 through the orifice 48, thence through the check valve and passages 25 and 26 into the cavity 31. The cavity 12 acts as a reservoir and also furnishes liquid to the spherical surfaces not only from the cavity 16, but through the recess 49.

In place of having the cavity 16 communicating with the cavity 12 the end of the cavity 16 adjacent the passage 48 may be permanently closed, as indicated by the dotted line 50 in Fig. 2, which represents the face of a wall which may close the cavity 16 adjacent the anchorage A thereby preventing any communication from the cavity 12 into the cavity 31 and in such case the check valve 46 would not be required. If desired, however, to provide an oil or other liquid supply for the cavity 31 in excess of that which the cavity will hold then the stem 15 may be tapped, as indicated at 51 in Fig. 2, to receive a connection to a separate reservoir mounted upon the car and this connection would naturally be of a flexible character for the reason that the draft gear moves about the ball anchorage. It is also evident that the member 28 may also be tapped, as indicated at 52 in Fig. 1, to receive a connection to a reservoir mounted upon the car, and this connection would likewise be flexible, and in the two latter modifications where a reservoir is connected to the members 15 and 28 a check valve would be advisable adjacent the members 15 and 28 to prevent back pressure building up in the reservoirs or in the connections, and these check valves may be of any of the various standard types with which those skilled in the art are familiar.

The normal position of the various parts relative to each other is shown in Figs. 1 and 2.

In operation when two cars are brought together the impact will tend to move the outer telescopic member 28—29 toward the anchorage A and in the direction indicated by the arrow in Fig. 3, and this will occur in both cars and tend to compress the spring 24. The relative position of the parts under such action are shown in Fig. 3. It will be noted that the shoulder 33 engaging with the collar 22 moves the collar 22 toward the anchorage A thereby producing the space 53 between the shoulder 20 and the collar 22. Likewise a space 54 has been produced between the collar 23 and the shoulder 36 and the collar 23 is butting against the shoulder 21. Under compressive action the collar 23 is immovable for the reason that it butts against the shoulder 21 on the stem 15 which is immovable, but the bushing 35 moves with the outer telescopic member 28, and, therefore, moves away from the collar 23 producing the aforesaid cavity 54.

Since the cavity 31 is filled with a liquid the sudden movement under impact of the collar 22 toward the collar 23 will tend to reduce the space 31 and this will tend to compress such fluid as is in the cavity 31 and the tendency will be for it to flow to parts where there is less resistance. The compressed fluid will tend to flow through the passage 26 and passage 25 into the cavity 16 and thence into the cavity 12, but as this is undesirable, I have placed the check valve 46 as described and it will immediately close upon sudden flow of fluid into the cavity 16 thereby tending to maintain pressure within the cavity 31. It is, however, desirable to permit a certain amount of reduction in fluid pressure within the cavity 31 and this may be brought about by various means, but one of the simplest is that of producing sufficient spaces between the adjacent faces of the stem 17 and the collars 22 and 23, and which I have indicated as 55 and 56 respectively. The rapidity with which the fluid may flow out of the chamber 31 through the annular passages 55 and 56 will, of course, depend upon the close sectional area of these passages and the reduction of pressure of the liquid within the cavity 31 will be governed accordingly. The fluid which flows through the passages 55 and 56 will enter the cavities 53 and 54 respectively and in order that the flow may be quite unobstructed after flowing through the passages 55 and 56 I place a plurality of indented grooves 57 in the face of the collars 22 and 23 and adjacent the shoulders 20 and 21 and these grooves form a connecting passage between the passages 55 and 56 and the respective cavities 53 and 54. The space between the adjacent faces of the collars 22 and 23 and the inner wall of the member 28 I prefer to make a reasonably close sliding fit so that very little fluid will pass at these points, therefore, the entire amount of fluid flowing from the cavity 31 into the cavities 53 and 54 is regulated by the area of the annular passages 55 and 56.

When the pressure is relieved after movement of the members 28—29 in the direction of the arrow in Fig. 2 if the draft gear was of the ordinary type in which the parts are returned to a normal position by means of a spring, then the parts would return quickly, but in the construction which I have shown and described with the use of the fluid in the chamber 31 and which has been caused to entirely fill the chambers 53 and 54, the return of the parts to normal is not under the control of the spring 24 only, but is also controlled by the return flow of the liquid from the chambers 53 and 54 into the chamber 31 which checks a rapid return of the parts. The return rate of flow is controlled largely by the tension in the spring 31 and the size of the annular passages 55 and 56. The kind of fluid used in the chamber 31 will, of course, affect the rate of flow, but having decided on the material to be used in the chamber and the rate of operation of the parts under compression and tension, the annular openings 55 and 56 may be made according to fixed standards which are established through experiment.

If the parts are placed under tension so that the member 28—29 is moved in the direction of the arrow in Fig. 4 with respect to the anchorage A, then the operation will be the same as described with respect to Fig. 3 excepting the collars 22 and 23 will form with the adjacent shoulders 33 and 21 spaces 58 and 59 respectively.

It will be evident that the fluid contained in the chamber 31 will cause the draft gear to act more slowly than when the spring 31 is used alone and will tend to increase the capacity of the draft gear over that of the spring alone and also when tension or compression is relieved the spring will not be able to return the parts to normal with a quick action, but the time will be required for the parts to return to normal, depending upon the openings 55 and 56.

The fluid in the chamber 31 if of a lubricating character will tend to decrease the capacity of the spring 24 from its normal dry operating capacity, but the action of the fluid in the draft gear is such that it will more than make up for the lost capacity in the spring and at the same time the spring working under a lubricating fluid will last much longer than when working dry. This is particularly true of the type of spring shown and which is known as a friction draft spring in which the surfaces of the inner and outer coils X and Y contact and bind upon each other with increasing friction as the compression of the spring increases.

The fluid in the chamber 31 may be a lubricating oil, preferably as near a zero temperature co-efficient as possible, or it may be glycerine or water, or other suitable liquids, depending upon the properties required and conditions to be met.

A draft gear constructed according to the disclosure herein has a very high capacity and operates practically with no noise or jar as there is substantially no lost motion in the same.

It will be observed that I have described a draft gear in which a single spring is used which operates under both tension and compression of the draft gear and is compressed under every action of the gear.

The U leather packings 41 and 44 are preferably made of leather which insures long life, and I find is automatic in its action in preventing the escape of fluid in that, the greater the pressure tending to force liquid passed the pack joint the greater will be the tendency of the packing to resist such flow.

From the cavity 32 I provide a passage 60 which will permit the drainage of any fluid which might by chance enter the chamber 32.

Those skilled in the art will upon reading my disclosure have suggested to them modifications which may be made and, therefore, I do not wish to be limited other than by my claims.

I claim:

1. A draft gear comprising a pair of telescopic members, one of the members forming an enclosure adapted to contain a liquid, a single yielding member interposed between the said members to yieldingly hold them in a predetermined position with respect to relative longitudinal movement in either direction and means cooperating with the fluid within the member to yieldingly resist the relative longitudinal movement of the members in both directions.

2. A draft gear comprising an enclosing member adapted to contain a fluid, a telescopic member positioned within the enclosing member and movable longitudinally relative thereto, a spring mounted on the telescopic member and held in position thereon by spaced means within the enclosing member and whose distance apart is adjustable to hold the members in a normally predetermined position and means to bring pressure upon the fluid within the enclosing member to resist relative longitudinal movement of the members when external force tends to move them longitudinally.

3. A draft gear comprising an enclosing member containing a fluid, a telescopic member positioned within the enclosing member and containing a passage leading from the enclosing member, a single spring tending to yieldingly maintain the members in a predetermined relative position, and yielding means acted upon by the fluid contained within the enclosing member upon a sudden longitudinal movement of one of the members to close the passage and confine the fluid within the enclosing member to resist relative telescopic movement of the members under an external force tending to move the members.

4. A draft gear comprising an enclosing member forming a receptacle containing a fluid and a telescopic member slidably mounted within the enclosing member, a spring to yieldingly maintain and lock the members in a predetermined relation and an auxiliary receptacle formed within the enclosing member when the members move in either direction relative to each other and means to permit a restricted flow of the fluid from the main receptacle into the auxiliary receptacle and vice versa.

5. A draft gear comprising an enclosing member forming a receptacle and containing a fluid and a telescopic member positioned within the recess for relative longitudinal movement, a single spring interlocking the members in a predetermined position but permitting relative longitudinal movement in either direction and positioned within the receptacle, means attached to one of the members to secure the draft gear to a car and having a receptacle therein containing a fluid and a communication between said receptacles, and a check valve in the said communication to close when the members move relative to each other to raise the fluid pressure within the enclosing member under said relative movement and yieldingly restrict said movement.

6. A draft gear comprising an enclosing member, a telescopic member positioned within the enclosing member and movable longitudinally relative thereto in either direction, a single spring yieldingly interlocking the members in a predetermined normal position but permitting longitudinal movement of the members in either direction and acting to return the members to normal position after a movement of the members in either direction and fluid pressure means to retard the return action of the spring but not prevent it.

7. A draft gear comprising a housing member containing a fluid, spaced shoulders formed within the housing member, a stem member telescopically mounted in the housing member and having two shoulders positioned within the housing member, a collar to engage each shoulder and spaced from one of the members, a spring interposed between the collars tending to move them into and hold them in engagement with the shoulders, the fluid within the housing arranged to flow through said space between the collars and the members to restrict the movement of said members when the members move relative to each other from outside influence.

8. A draft gear comprising a housing, spaced shoulders formed within the housing, a collar engaging each shoulder, a stem mounted in telescopic relation to and within the housing and having spaced shoulders thereon conforming substantially with the spaced shoulders on the housing, collars slidably mounted on the stem to engage the shoulders on the housing and on the stem, a draft spring loosely positioned on the stem between the collars and normally holding the collars in engagement with their respective shoulders on the housing and to be further compressed with the relative movement of the housing and the stem in either direction, an anchorage member to be secured to a car and having a ball terminal with a chamber therein, means on the end of the stem to engage the ball member and permit relative movement in all directions, a passage through the stem communicating with the interior of the housing and a passage in the ball member communicating with the chamber in the ball and with the passage in the stem, fluid in the interior of the housing, the chamber in the ball and the passage between the interior of the housing and said chamber and a check valve to prevent the fluid within the housing flowing into the chamber when the housing and stem move relative to each other.

9. A coupler anchorage comprising a supporting member to be attached to a car and having a ball at one end provided with a spherical surface, a socket forming a receptacle with an opening through which passes a neck connecting the support and ball, secured to the ball and arranged to permit freedom of movement of the socket relative to the ball, a stem projecting from the socket and positioned within a housing, a spring member interlocking the housing and stem to compel compression of the spring when the housing and stem move relative to each other in either of two longitudinal directions, the stem having a passage communicating with the interior of the housing and the interior or the socket and means to prevent the flow of a fluid through said passage in one direction only.

10. A draft gear comprising a housing, spaced shoulders formed within the housing, a collar engaging each shoulder, a spring interposed between the collars and tending to move them into and normally hold them in engagement with their respective shoulders, a stem mounted within the housing in telescopic relation to the parts, hollow means on the stem to secure the gear to a support, the stem having a passage communicating with the interior of the hollow means and the housing and shoulders on the stem to alternately engage the collars depending upon the direction of relative movement of the stem and housing and to cause an increased compression upon the spring and means to close communication through the passage in one direction but not the other direction.

11. A collar for a draft gear comprising a circular disc having oppositely disposed faces and an outer peripheral surface to fit within a draft gear housing adjacent to the interior surface thereof and a central hole through the collar adopted to receive a stem and in spaced relation thereto one of the faces of the disc having passages or depressions communicating with the space between the disc and the stem.

12. A draft gear comprising a pair of telescopic members and one member constituting a housing adapted to contain a fluid, yielding means to maintain the members in a normal predetermined position, packing stationary with respect to the housing to prevent leakage of the fluid at one end of the housing and packing stationary with respect to the other member to prevent leakage of the fluid from the other end of the housing.

13. A draft gear comprising an enclosing member adapted to contain a non-compressible fluid, a horizontally movable telescopic member positioned within the enclosing member, means to secure one of the members to an anchorage, a single spring within the enclosing member to yieldingly lock and maintain the members in a predetermined position, a receptacle having communication with the interior of the enclosing member and adapted to contain a fluid to act as a source of supply to that within the enclosing member and means to cause the fluid within the enclosing member to yieldingly resist the relative horizontal movement of the members under an external force tending to move them.

14. A draft gear comprising an enclosing member containing a fluid, a telescopic member positioned within the enclosing member and movable in two directions from a normal position, means to secure one of the members to a car anchorage, means to secure the other member to a coupler head, a single yielding member interposed between the aforesaid members to lock and maintain the members in a predetermined relation and return them to said relation after relative movement in either of two longitudinal directions from their normal position.

15. A draft gear comprising an enclosing member and a telescopic member slidably mounted within the enclosing member, a spring to yieldingly lock and maintain the members in a predetermined relation and normally maintain a single receptacle within the enclosing member containing a fluid, and means to form an auxiliary receptacle within the enclosing member when the members move in either direction and simultaneously decrease the capacity of the main receptacle as the capacity of the auxiliary receptacle increases and a communicating passage from the main to the auxiliary receptacle of restricted but constant area as the telescopic members move relative to each other.

In testimony whereof I affix my signature.

CHARLES H. TOMLINSON.